(12) United States Patent
Weber

(10) Patent No.: US 12,045,381 B2
(45) Date of Patent: Jul. 23, 2024

(54) ACTIVE CONTROL OF COMMUNICATIONS BUS FOR CYBER-ATTACK MITIGATION

(71) Applicant: BAE Systems Information and Electronic Systems Integration Inc., Nashua, NH (US)

(72) Inventor: Michael J. Weber, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 228 days.

(21) Appl. No.: 17/359,930

(22) Filed: Jun. 28, 2021

(65) Prior Publication Data
US 2022/0414274 A1    Dec. 29, 2022

(51) Int. Cl.
G06F 21/55 (2013.01)
G06F 21/56 (2013.01)
G06F 21/85 (2013.01)

(52) U.S. Cl.
CPC ........... G06F 21/85 (2013.01); G06F 21/554 (2013.01); G06F 21/556 (2013.01); G06F 21/566 (2013.01)

(58) Field of Classification Search
CPC ...... G06F 21/85; G06F 21/554; G06F 21/556; G06F 21/566
See application file for complete search history.

(56) References Cited

U.S. PATENT DOCUMENTS

| 2019/0306180 A1* | 10/2019 | Dyakin | G06F 21/566 |
| 2019/0385057 A1* | 12/2019 | Litichever | H04L 63/14 |
| 2020/0143053 A1* | 5/2020 | Gutierrez | G06F 21/554 |
| 2021/0144124 A1* | 5/2021 | Maeda | H04L 12/44 |

FOREIGN PATENT DOCUMENTS

WO    2022231617 A1    11/2022

OTHER PUBLICATIONS

1553 Guard, "Cyber Resiliency for MIL-STD-1553 Data Bus," Abaco Systems, Datasheet, 2021. 2 pages.
DeSanto D., et al., "Exploiting the MIL-STD-1553 avionic data bus with an active cyber device", ScienceDirect, Computers & Security, 2021, 21 pages.
Richards Pat, "Understanding Microchip's CAN Module Bit Timing", MicroChip AN754, Microchip Technology Inc., 2001, 13 pages.
Bus Defender Products, Peraton Labs, 2022.

* cited by examiner

*Primary Examiner* — Nelson S. Giddins
(74) *Attorney, Agent, or Firm* — Finch & Maloney PLLC; Gary McFaline

(57) ABSTRACT

Techniques are provided for actively controlling a communications bus to mitigate threats, including cyber-attacks. A methodology implementing the techniques according to an embodiment includes detecting a threat in a message that is being transmitted between nodes on the communications bus. The message comprises one or more message frames and the threat detection is based on analysis of an initial portion of the message frame. The method further includes actively controlling the bus, based on the threat detection, to prevent the remaining portion of the message frame from delivering the threat to one or more of the nodes on the bus. Actively controlling the bus includes isolating nodes from the bus and/or overwriting data in the remaining portion of the message frame to invalidate the message frame or to remove the threat from the message frame.

20 Claims, 10 Drawing Sheets

ACTIVE CONTROL OF COMMUNICATIONS BUS FOR CYBER-ATTACK MITIGATION

FIELD OF DISCLOSURE

The present disclosure relates to cyber-attacks, and more particularly, to detection and mitigation of cyber-attacks using active control of a communications bus.

BACKGROUND

Cyber threats/attacks are a growing concern as they increase in frequency, sophistication, and destructive capability. A virus or other malicious code may be introduced into one system on the communications bus of the system, which can then infect other systems that share the bus or otherwise receive information via that bus. The end result is that the threat can neutralize, disable, or seize control of the system, or subsystems thereof, in a manner that causes harm or damage. Existing bus communication monitoring technologies are passive in that they may generate an alert, but they provide no mechanism to directly respond to the detected threats to disrupt the cyber-attack and avoid or otherwise mitigate the resulting harm.

Figure 1:
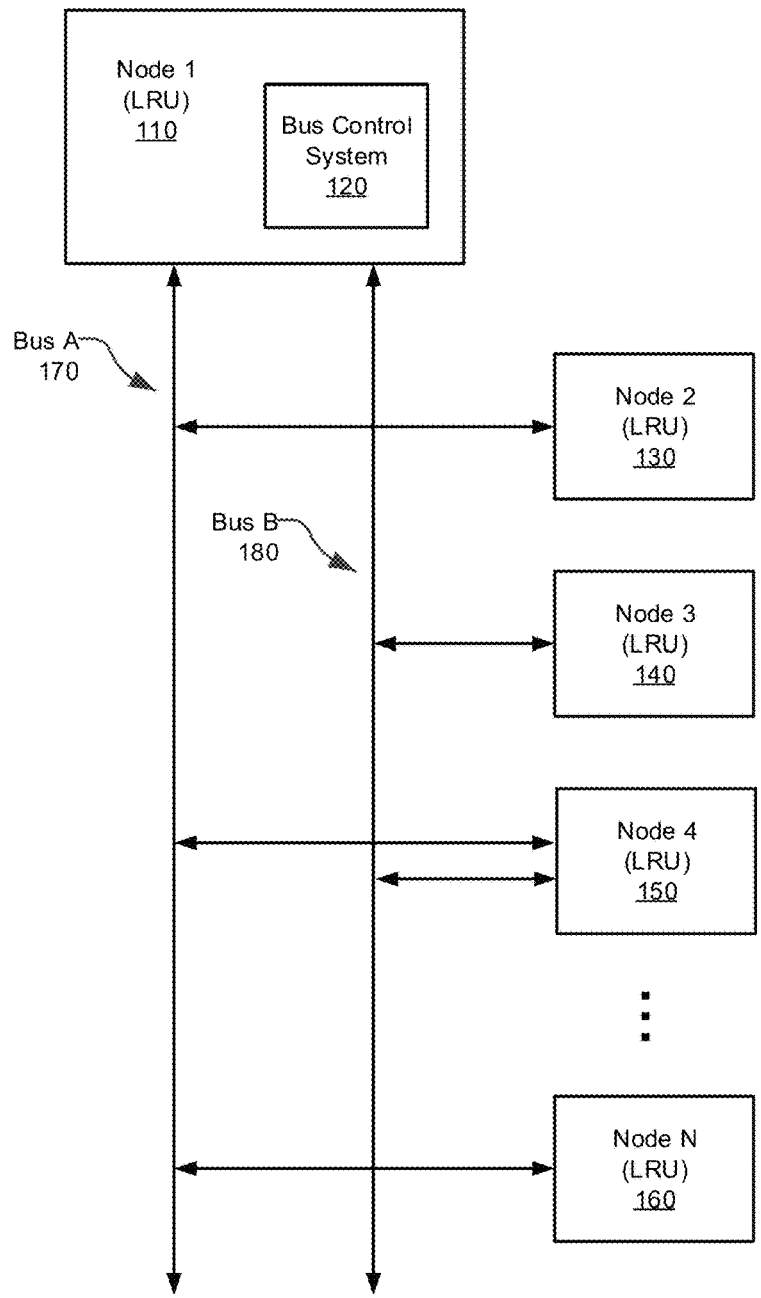
FIG. 1 illustrates an example multi-node system having a communications bus configured for cyber-attack mitigation, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for actively controlling a communications bus to mitigate the effects of detected threats, including cyber-attacks. As noted previously, cyber threats/attacks are a growing concern and have increased in sophistication to be able to attack systems, platforms, and hardware of all types. To this end, and in accordance with an embodiment of the present disclosure, an active bus control system is disclosed which provides relatively early detection of a threat based on analysis of an initial portion of a message frame transmitted on the bus. The early detection provides time to actively control the bus to neutralize the threat contained in the remaining portion of the message frame, as described in greater detail below.

In some embodiments, the device monitors and decodes bus messages in real-time, making threat decisions with respect to each message as the message is being transmitted. When a decision to act is made, the bus is electrically stimulated to prevent receivers from receiving the remainder of the message, either by completely suppressing the transmission or by altering the signal sufficiently to cause a compliant receiver to reject the message. In some embodiments, the messages can be modified or overwritten while in-flight or during use such that they are restored to the correct or desired content, as will be explained below.

The disclosed techniques can be implemented, for example, in a computing system or a software product executable or otherwise controllable by such systems, although other embodiments will be apparent (e.g., gate-level logic). In accordance with an embodiment, a methodology to implement these techniques includes monitoring messages that are passed between nodes on the communications bus and detecting threats that may be embedded in those messages. The messages comprise one or more message frames and the threat detection is based on analysis of an initial portion of the message frame, according to some such embodiments. The method further includes actively controlling the bus, in response to the threat detection, to prevent the remaining portion of the message frame from delivering the threat to one or more of the nodes on the bus. Actively controlling the bus may include, for example, isolating one or more nodes from the bus and/or overwriting data in the remaining portion of the message frame to invalidate (or repair) the message frame or to otherwise remove the threat from the message frame. In some embodiments, overwriting data is achieved by applying voltages and/or loads to the signal lines of the bus to change bits from ones to zeros and vice versa as appropriate to either invalidate or correct the message, in either case removing the threat.

It will be appreciated that the cyber-attack mitigation techniques employing active bus control described herein may provide improved protection against cyber-attacks, compared to existing passive techniques that generate alerts but provide no mechanism to directly respond to the detected threats in real-time to prevent or otherwise mitigate the attack and avoid or otherwise reduce the potential resulting damage. Additionally, since the active bus control system can be incorporated into an existing node, there is no requirement to add an extra node to the bus (or to provide an intervening node between the bus and each existing node) to implement the disclosed techniques, which may not be practical or acceptable in certain applications. The techniques disclosed herein may further be implemented in hardware or software or a combination thereof. Numerous embodiments and applications will be apparent in light of this disclosure.

FIG. 1 illustrates an example multi-node system having a communications bus configured for cyber-attack mitigation 100, in accordance with an embodiment of the present disclosure. One or more busses (e.g., bus A 170 and bus B 180) are shown to provide communication between nodes (e.g., systems or subsystems) of an overall system. The nodes can be referred to as line replaceable units or LRUs in that they may be self-contained units that can be readily swapped in or out of the overall system by plugging/ unplugging from the bus. In some embodiments, the overall system may be included on a mobile or fixed platform. The platform may be, for instance, an aircraft, an unmanned aerial vehicle, a projectile, a missile, a ship, a vehicle, a ground-based communication or missile defense system, or any platform that comprises multiple systems that communicate over a bus. For example, if the platform is an aircraft or a ground-based missile defense system, the first node 110 may be a communications system, the second node 130 may be a radar system, the third node 140 may be a guidance system, and the fourth node 150 may be a weapons control system. In some embodiments, the overall system may be included in an industrial plant, an office building, or a smart home (comprising a number of intelligent units that communicate with each other to perform various functions). In some embodiments, note that there may be multiple busses, where each node may communicate with one or more of the busses. In another embodiment, the platform is a vehicle such as a car that is at risk due to the advanced computing resources that include external communications for navigation, entertainment, and the like such that many newer cars are referred to as computers on wheels. There are many documented examples of cars being hacked such that the industry requires a security solution, especially as semi-automation and autonomous support evolves.

Node 1 110 is shown to include an active bus control system 120 configured to detect and mitigate cyber-attacks that are transmitted over the bus. In some embodiments, the active bus control system 120 is coupled to the bus through a hardwired connection. In some embodiments, the bus may be a Controller-Area-Network (CAN) bus, a military standard (MIL-STD) 1553 bus, or an Aeronautical Radio (ARINC) 429 bus, although other types of busses are possible. The operation of the active bus control system 120 will be described in greater detail below, but at a high level, the system is configured to detect threats in message frames based on analysis of an initial portion of the frame (e.g., the minimum portion of the frame from which a threat can be detected), and then control the communications bus in time to prevent transmission of the remaining portion of the message frame to the other bus nodes. Control of the bus may include isolating nodes from the bus or manipulating the signal lines of the bus to invalidate the message frame or otherwise neutralize the threat. Active bus control can provide the following capabilities: (1) self-isolating a node that has become compromised by dropping all outgoing frames to prevent the node from propagating the threat; (2) suppressing local receipt of specific messages deemed to contain threats; (3) suppressing global receipt of specific messages on the bus regardless of origin; and (4) silencing a remote rogue node by corrupting or suppressing all transmission from that node.

The bus control system 120 is shown to be incorporated in node 1 110, but in some embodiments additional bus control systems may be employed in one or more other nodes.

Figure 2:
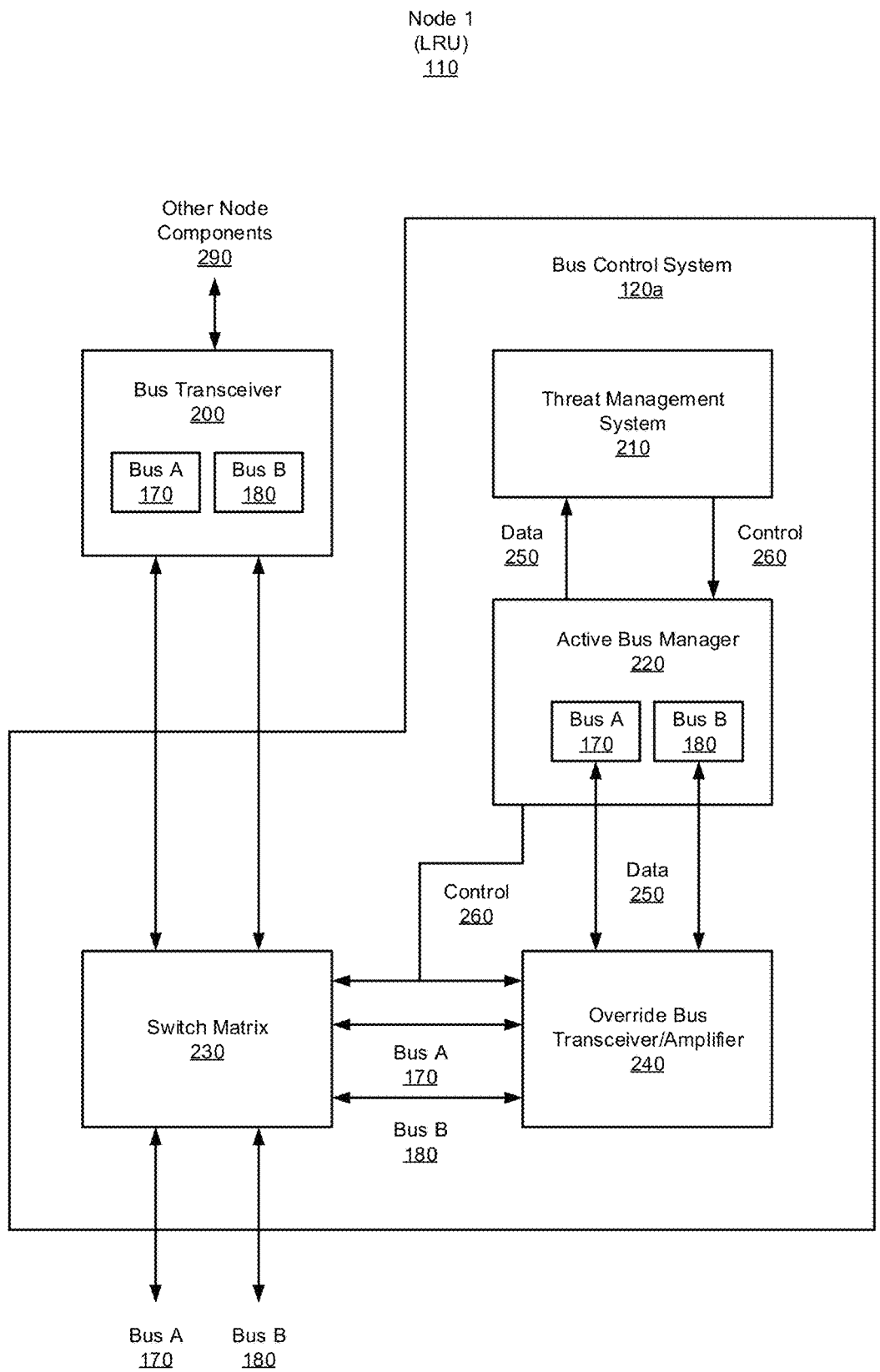
FIG. 2 is a block diagram of an example bus node including a bus control system, configured in accordance with an embodiment of the present disclosure.

FIG. 2 is a block diagram of bus node 1 110 including a bus control system 120a and a bus transceiver 200, configured in accordance with an embodiment of the present disclosure. The bus control system 120a is shown to include a threat management system 210, an active bus manager 220, an override bus transceiver/amplifier 240, and a switch matrix 230. Two communications busses (bus A 170 and bus B 180) are shown in this example for illustrative purposes, but any number of busses may be employed in practice. The following description focuses on one bus for clarity, but it will be understood that the techniques are applicable to any number of busses that the overall system may utilize. The bus node 110 may include other modules or componentry, in addition to that shown. For example, if the node is a radar system it may include an antenna, a radar transceiver, filters, amplifiers, and signal processing components, etc.

Bus transceiver 200 is a legacy component of the node that is configured to interface between the bus (or busses) 170, 180 and the other components of the node 290 (not shown), using any techniques in light of the present disclosure. The other node components 290 are configured to perform the functions associated with the intended purpose of that node. For example, if the node is a radar system then the other components 290 perform radar related functions. In some cases, bus transceiver 200 is included in every node on the bus, whether or not that node also includes a bus control system 120. If the node does not include a bus control system 120, then the switch matrix 230 is not present and the bus transceiver 200 is coupled directly to the busses 170, 180. If the node 110 does include a bus control system 120, then the switch matrix 230 is present and configured to switch the communications busses 170, 180 between the legacy bus transceiver 200 and the override bus transceiver/ amplifier 240 under control of the active bus manager 220, as will be explained in greater detail below.

The active bus manager 220 is configured to capture data 250, which represents messages on the bus 170, by controlling 260 the switch matrix 230 to switch the bus signals through the override bus transceiver/amplifier 240 back to the active bus manager 220. It should be noted that the bus transceiver 200 is not disconnected from the bus 170 at this point, the active bus manager 220 is simply listening in on the bus communications. The bus manager 220 captures each frame of the message data (both incoming and outgoing with respect to node 1) in real-time or near real-time, as each unit of data (e.g., bits, bytes, words, etc.) become available and provides that data to the threat management system 210, which is described below. In some embodiments, bus manager 220 also analyzes the data by comparing the data to threat rules that are stored locally (e.g., in the form of locally accessible lookup tables) as a mechanism to detect threats in addition to the threat management system 210 (which, in some embodiments, may be local or remote). Threats are detected based on analysis of an initial portion of the message frame so that preventative action can be taken before the remainder of the frame is transmitted. The length of the initial portion will vary depending on a number of factors including, for example, the type of bus, the type of message, and the type of threat. In general, however, the initial portion may extend from the beginning of the frame up until the point where enough data bits have been collected and analyzed such that a determination can be made that a threat exists in the message, without having to wait until the entire frame can be received and examined, at which point it would be too late to take defensive action.

The active bus manager 220 is also configured to take action to manage the bus in the event that a threat is detected, either by local rule match or by the threat management system 210. One or more of several types of actions may be taken to prevent the remaining portion of the message frame from delivering the threat to one or more of the nodes. For example, in some embodiments, an incoming frame (incoming to node 1) can be dropped by isolating the node's bus transceiver 200 from the bus 170 via the switch matrix 230.

In some embodiments, an incoming frame to node 1 can be invalidated for all nodes on the bus by overwriting its data and/or cyclic redundancy check (CRC)/parity information such that compliant transceivers 200 of each node see the frame as corrupted and drop that frame. This can be accomplished by the override bus transceiver/amplifier 240, as described below. Optionally, and in addition, the frame can be acknowledged (ACKed), for busses that ACK frames, so that the transmitting node believes the message was sent and received correctly and does not try to re-transmit.

In some embodiments, the data of an incoming frame to node 1 can be selectively modified (e.g., overwritten), and a new correct CRC/parity provided based on the modifications. In some embodiments, the frame can be modified from the perspective of the node 1 bus transceiver 200. In some embodiments, the frame can be modified from the perspective of all nodes on the bus. The modifications are made with the intent to remove the threat from the message frame. For example, cyber-attack code that is embedded in the frame can be replaced with alternate code that is harmless or relatively less harmful. Alternatively, or additionally, incorrect data in the message, resulting from a cyber-attack or a faulty system component and which could potentially be harmful, may be replaced with data that is more plausible (e.g., less incorrect).

In some embodiments, an outgoing frame (outgoing from node 1) can be dropped by isolating the node 1 bus transceiver 200 from the bus 170 via the switch matrix 230. Optionally, the frame can be ACKed, for busses that ACK frames, so that the node 1 transmitter believes the frame was sent correctly and does not try to re-transmit.

In some embodiments, the data of an outgoing frame can be selectively modified (e.g., overwritten), and a new correct CRC/parity provided based on the modifications. In some embodiments, the frame can be modified for consumption by all other nodes on the bus. The local node 110 will not be aware of the overwrite. In some embodiments, the modification serves to correct/restore the threat corrupted message as will be described below.

In some embodiments, the choice of which action to take may be based on the type of threat detected, situational conditions, or other criteria relevant to a given application, in light of the present disclosure.

The threat management system 210 is configured to detect a threat based on analysis of an initial portion of a message frame as provided by active bus manager 220. In some embodiments, the threat may be detected based on a comparison of data from the initial portion of the message frame to known threat characteristics, which may, for example, be stored and retrieved from a threat database. The threat management system 210 may retain state information, for example based on analysis of previous message frames, to aid in the assessment of the current message frame. The threat management system 210 can then decide, based on the threat assessment, which frames should be actively managed by active bus manager 220. In some embodiments, the threat management system 210 is local to the node. In some other embodiments, the threat management system 210 may be implemented in a remote location from the node and communicate through any suitable means. In some embodiments, the active bus manager 220 may act within the scope of its own capabilities (e.g., without the aid of an external threat management system), although these capabilities may be more limited.

The override bus transceiver/amplifier 240 is configured to control the bus by overwriting data on the remaining portion of the message frame, under the direction of the active bus manager 220. The overwritten data is intended to invalidate the message frame or otherwise render the frame harmless, as previously described. In some embodiments, the override bus transceiver/amplifier 240 is configured to control the bus by applying voltages and/or loads to signal lines of the bus to toggle one-bits to zero-bits and vice versa. The override bus transceiver/amplifier 240 provides the capability to control the signal levels on the bus, potentially overriding the active signaling of other nodes on the bus, by operating out-of-spec from the bus perspective to induce the desired signal state on the bus regardless of the states of other nodes.

Switch matrix 230 is configured to connect and disconnect the bus transceiver 200 and/or the override bus transceiver/amplifier 240 from the communications bus 170. The switch matrix provides transceiver protection when high-power bus manipulations are occurring and isolation when incoming or outgoing frames need to be dropped or manipulated.

Figure 3:
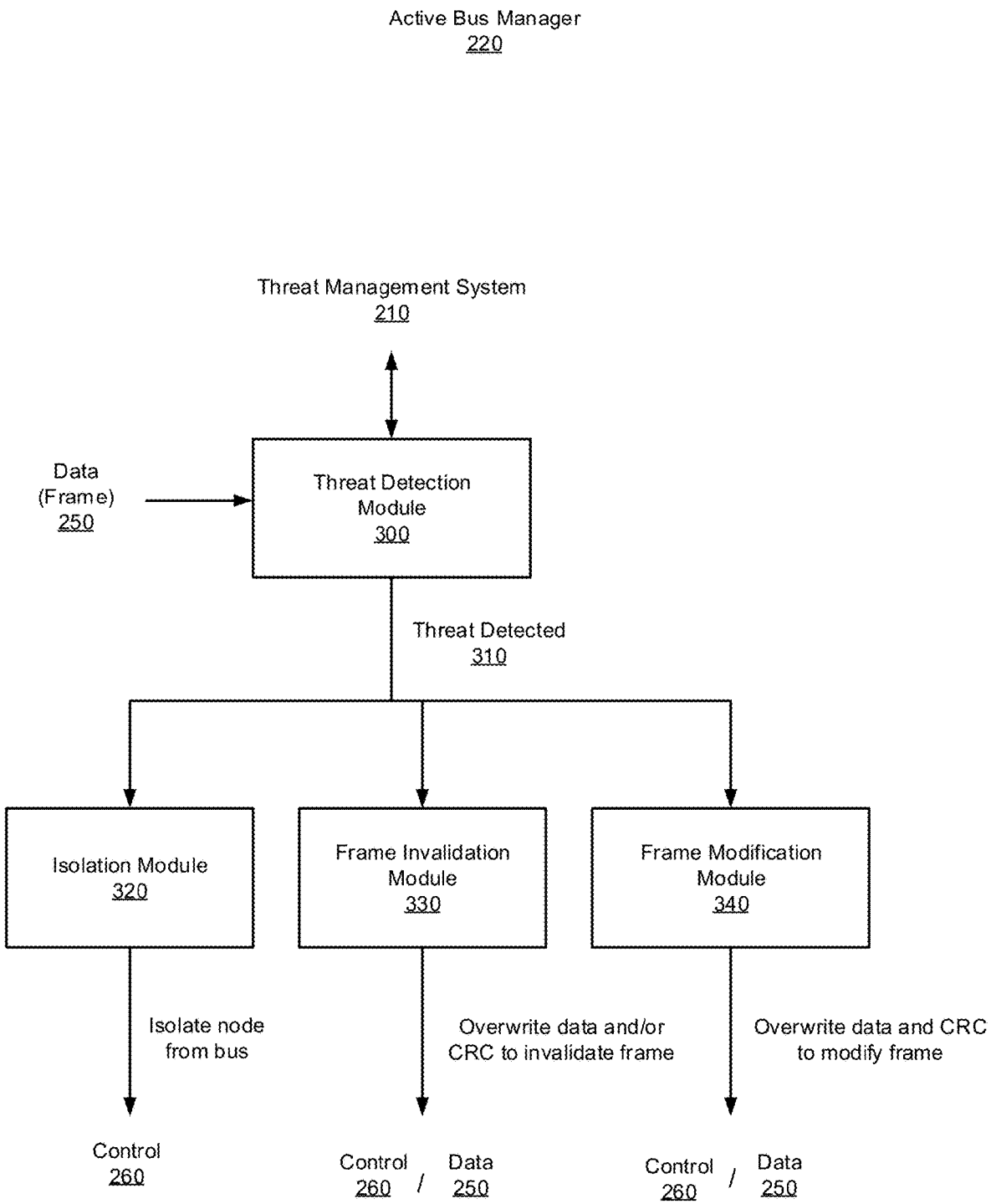
FIG. 3 is a block diagram of the active bus manager of the example bus node depicted in FIG. 2, configured in accordance with an embodiment of the present disclosure.

FIG. 3 is a block diagram of the active bus manager 220 of FIG. 2, configured in accordance with an embodiment of the present disclosure. The active bus manager 220 is shown to include threat detection module 300, isolation module 320, frame invalidation module 330, and frame modification module 340.

Threat detection module 300 is configured to detect a threat 310 based on analysis of an initial portion of a message frame in data 250. The detection may be based on a comparison of the data to threat rules that are stored locally and/or may be obtained from the threat management system 210 as previously described.

Isolation module 320 is configured to isolate the node from the communications bus, in response to the detected threat 310, by sending a control signal 260 to the switch matrix 230 which disconnects the bus transceiver 200 from the bus 170.

Frame invalidation module 330 is configured to invalidate a message frame, in response to the detected threat 310, by sending a control signal 260 and overwrite data 250 to the override bus transceiver/amplifier 240. The overwrite data can contain an invalid message, invalid CRC/parity information, or any signaling configuration that would have an invalidating effect (including replacement of signal with noise) to cause all other receiving nodes to reject the frame.

Frame modification module 340 is configured to modify a message frame, in response to the detected threat 310, by sending a control signal 260 and overwrite data 250 to the override bus transceiver/amplifier 240. The overwrite data can contain a valid message and a new correct CRC/parity associated with the modified message. The new valid message, or portion thereof, may be designed to implement code that is harmless in effect, or designed to serve some other purpose, in place of the pre-existing cyber-attack code or harmful data.

In some embodiments, the modification serves to correct/restore the threat corrupted message. For example, the threat management system 210 may detect that a two or more nodes (e.g., nodes 2 and 3) are generating messages that indicate a certain condition (e.g., "FUEL LOW), while one other node (e.g., node 4) is indicating a different condition (e.g., "FUEL LEVEL OK"). The discrepancy may lead to a harmful state for the platform. In such case, the threat management system 210 may decide that the message from node 4 is corrupted and correct that message to clear the "FUEL LEVEL OK" bit in the message from that node. In another example, the system may recognize grossly incorrect values for certain parameters contained in a message and correct those parameters to more reasonable values.

Figure 4:
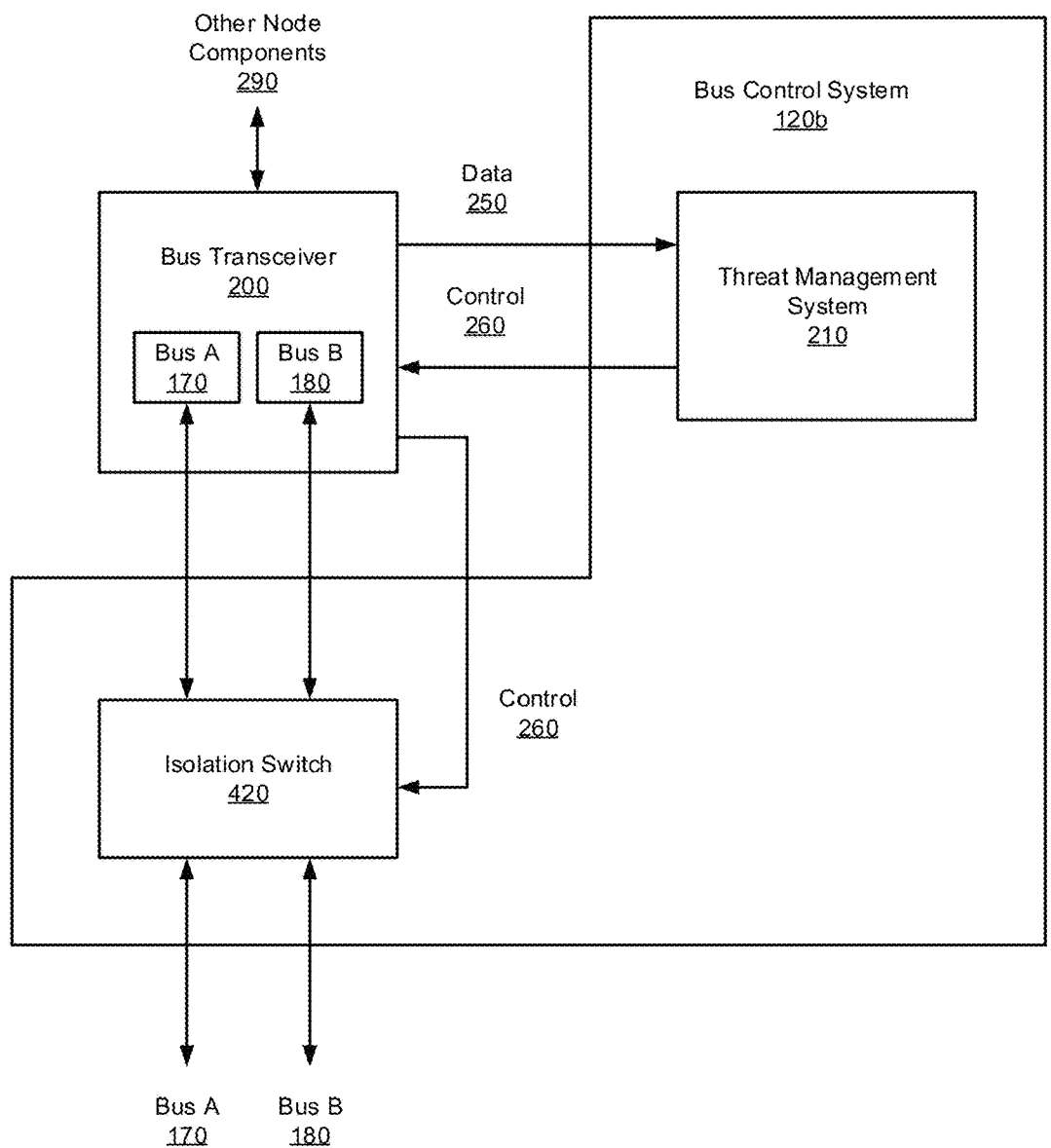
FIG. 4 is a block diagram of another example bus node including a bus control system, configured in accordance with an embodiment of the present disclosure.

FIG. 4 is a block diagram of a bus node 110 including a bus control system 120b, configured in accordance with another embodiment of the present disclosure. The bus control system 120b of this embodiment is a simplified version of the bus control system 120a described above, which provides reduced capability at a potentially lower cost. Bus control system 120b is shown to include isolation switch 420 and threat management system 210. Removal of the active bus manager 220 and override bus transceiver/amplifier 240 in this embodiment provides a benefit of avoiding the risk of bus interface standard violations and bus interference resulting from failed active bus manipulation hardware. The removal of these components, however, also eliminates the capabilities related to managing how remote nodes perceive transmissions from other remote nodes (e.g., through active bus manipulation). Local protection capabilities remain intact, however, since threat management system 210 can cause isolation switch 420 to isolate the node from the bus in response to a threat detection and thus prevent corrupted message frames from reaching or leaving the node.

Figure 5:
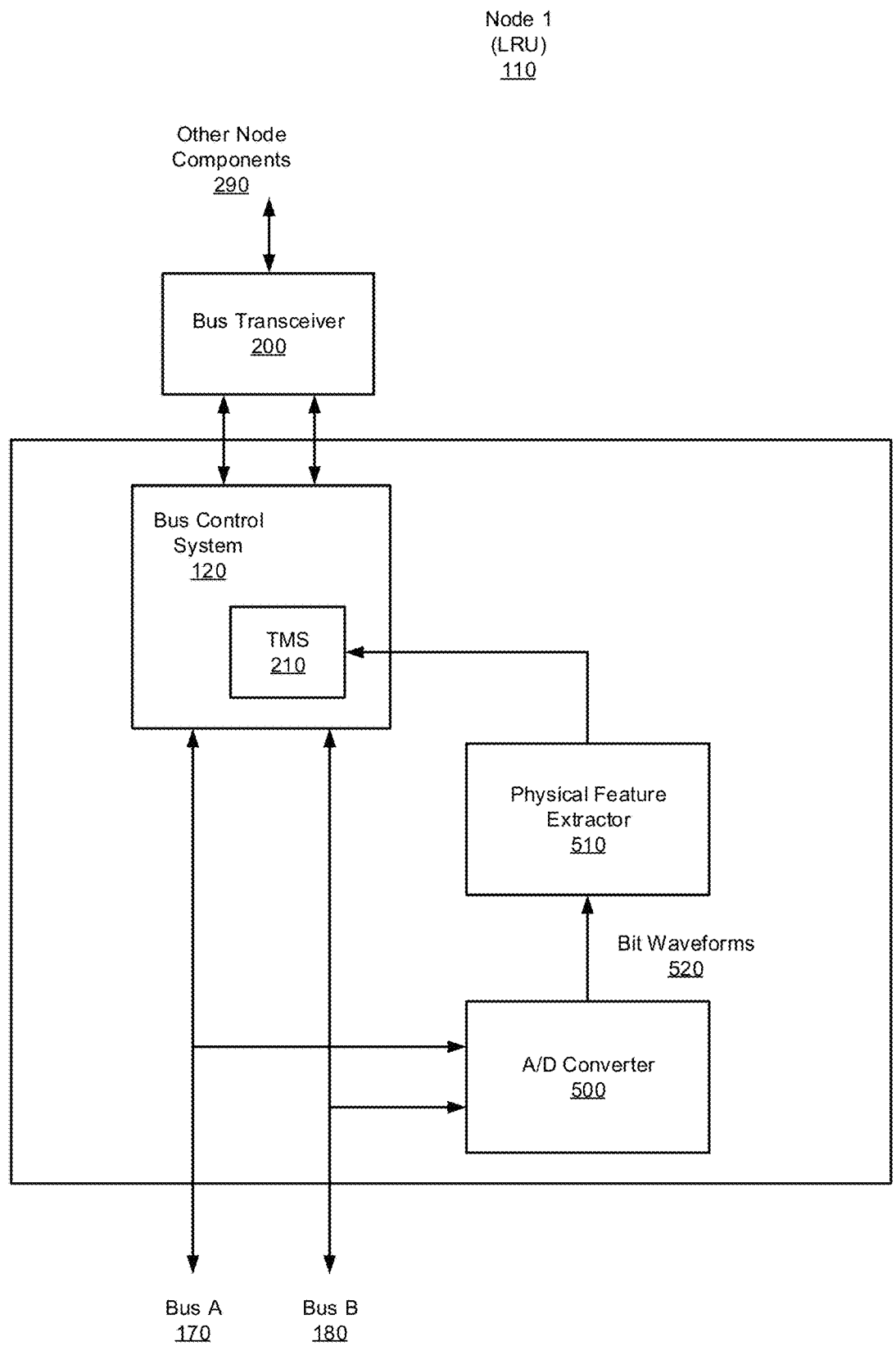
FIG. 5 is a block diagram of another example bus node including a bus control system, configured in accordance with an embodiment of the present disclosure.

FIG. 5 is a block diagram of a bus node 110 including a bus control system 120, configured in accordance with another embodiment of the present disclosure. In this embodiment, an analog to digital (A/D) converter 500 and a physical feature extractor 510 are included to monitor bus activity.

The A/D converter 500 is configured to sample activity on the busses 170, 180. Although the busses are digital busses in that they transmit signals representing one-bits and zero-bits, those signals are physically realized as underlying analog voltage waveforms on the signal lines of the bus. A/D converter 500 samples those signal lines at a sampling rate that is greater than the digital bit rate so that the waveforms 520 representing the bits can be captured.

The physical feature extractor 510 analyzes the bit waveforms 520 to provide an additional method for detecting threats. For example, in some cases, a node that has been compromised by a cyber-attack may generate and transmit signals onto the bus that deviate in some manner from normal signals (e.g., signals generated by uncompromised nodes). Deviation characteristics may include variations in rise time, fall time, pulse width, jitter, amplitude, or noise, to name a few, which fall outside the standard ranges as defined in the bus specification or defined by cyber-threat intelligence. In response to the detection of such anomalies, physical feature extractor 510 alerts the threat management system 210 of bus control system 120 so that further action can be taken, as previously described.

Methodology

FIGS. 6-9 are flowcharts illustrating methodologies for active bus control, in accordance with an embodiment of the present disclosure. As can be seen, the example methods include a number of phases and sub-processes, the sequence of which may vary from one embodiment to another. However, when considered in the aggregate, these phases and sub-processes form a process for active bus control to mitigate cyber-attacks, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIGS. 6-9 to the specific components illustrated in FIGS. 1-5, is not intended to imply any structural and/or use limitations. Rather other embodiments may include, for example, varying degrees of integration wherein multiple functionalities are effectively performed by one system. Numerous variations and alternative configurations will be apparent in light of this disclosure.

Figure 6:
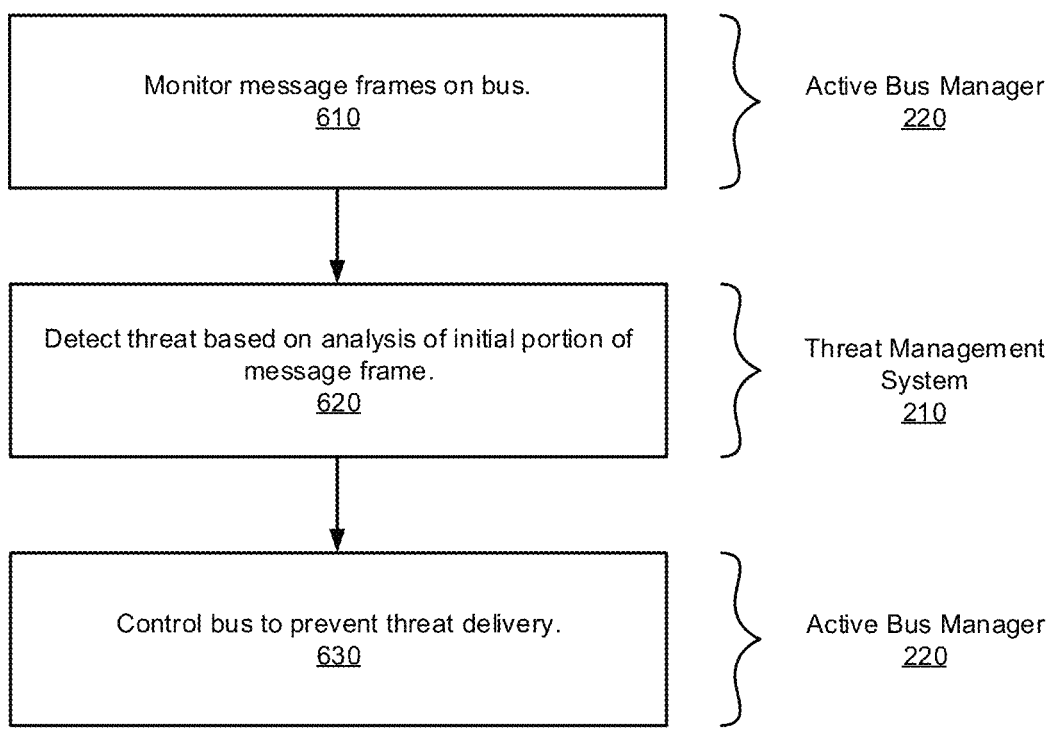
FIG. 6 is a flowchart illustrating a methodology for active bus control, in accordance with an embodiment of the present disclosure.

As illustrated in FIG. 6, in one embodiment method 600 commences, at operation 610, by monitoring message frames that are passed between nodes on the communications bus. This process is described in more detail in FIG. 7.

Next, at operation 620, a threat is detected based on an analysis of an initial portion of one of the message frames. In some embodiments, the initial portion is the smallest initial portion of the frame that provides sufficient information to detect the threat. This results in relatively earlier detection which allows for action to be taken before enough of the remaining portion of the frame can be received by other nodes to potentially cause harm. This process is described in more detail in FIG. 8. In some embodiments, the threat may be detected based on the analysis in conjunction with previous observations. For example, if a given node was previously determined to have been compromised, then any subsequent messages sourced from that node may also be determined to be a threat based solely on the "from" field of the initial portion of the frame.

At operation 630, the bus is actively controlled to prevent threat delivery to the nodes on the communications bus. In some embodiments, this active control of the bus may include, for example, isolating nodes from the bus. In some embodiments, active control may include overwriting data in the remaining portion of the message frame to invalidate the message frame or to remove the threat from the message frame. In some embodiments, active control may include overwriting data in the remaining portion of the message frame to correct or restore the message. This process is described in more detail in FIG. 9.

Figure 7:
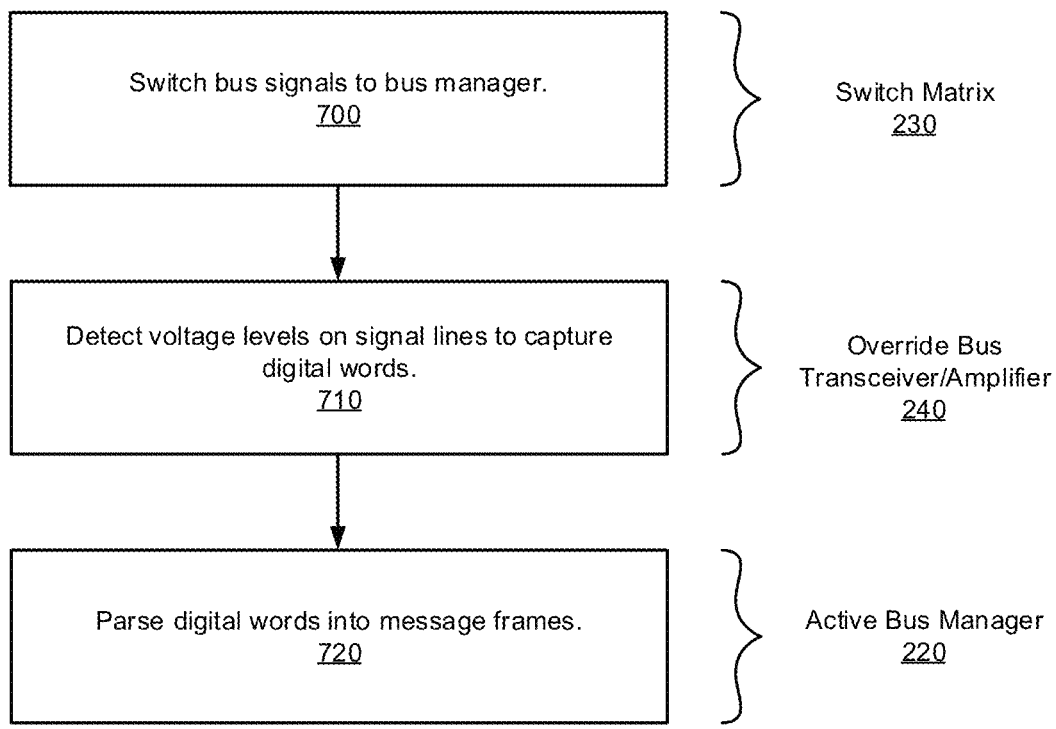
FIG. 7 is a flowchart illustrating a methodology for monitoring message frames, in accordance with an embodiment of the present disclosure.

As illustrated in FIG. 7, in one embodiment method 610 for monitoring message frames, commences, at operation 700, by employing the switch matrix 230 to switch signal lines of the bus to the override bus transceiver/amplifier 240. Next, at operation 710, voltage levels of the signal lines of the bus are read to capture signal bits and then form digital words from the bits. At operation 720, the digital words are accumulated and parsed into message frames by the active bus manager 220.

Figure 8:
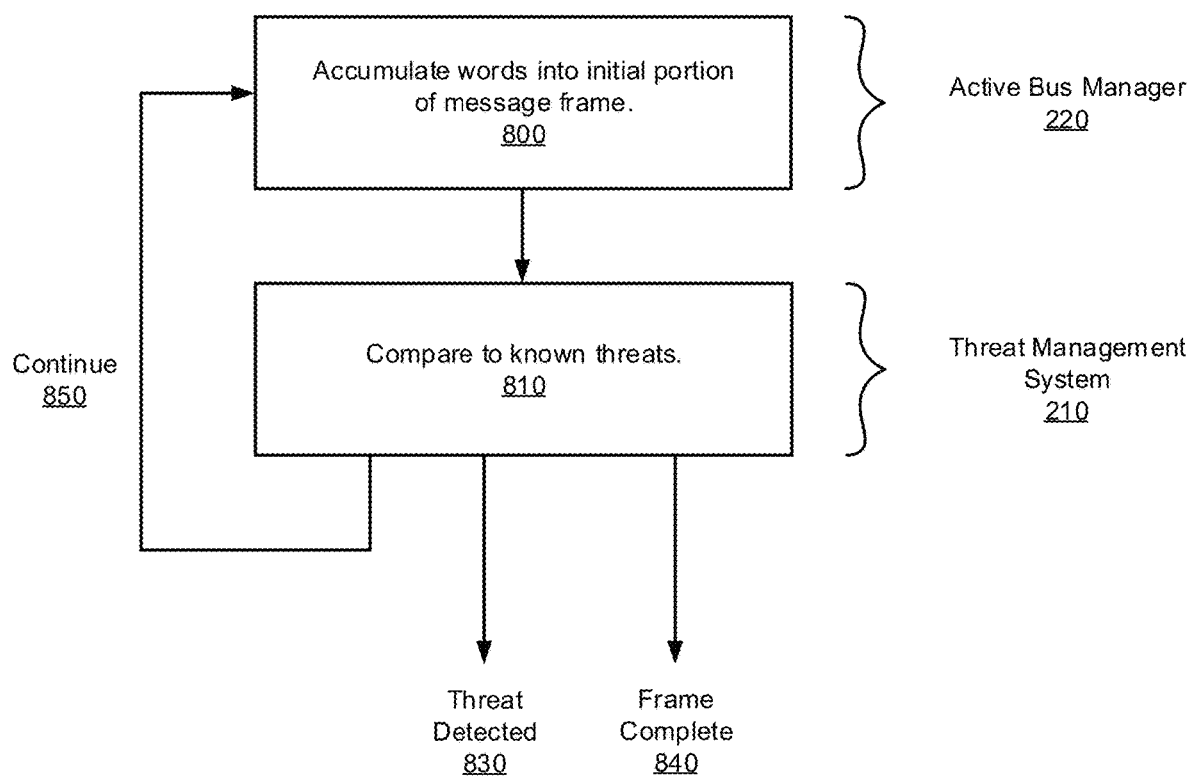
FIG. 8 is a flowchart illustrating a methodology for threat detection, in accordance with an embodiment of the present disclosure.

As illustrated in FIG. 8, in one embodiment method 620 for threat detection, commences, at operation 800, by accumulating the digital words, as they are received, to form an initial portion of the message frame. Next, at operation 840, the initial portion of the message frame that has been accumulated up that point is analyzed to detect threats. In some embodiments, the analysis may include a comparison of the initial portion of the message frame to known threat characteristics. The known threat characteristics may be stored in a database (either locally, remotely, or both) or provided through other suitable means and updated as new threats are discovered. The process continues 850 by looping back to operation 800, to accumulate additional words that have been received, until either a threat is detected 830 or the frame is complete 840. In some examples, known threat characteristics may be obtained through the use of machine learning, deep learning, and artificial intelligence techniques which can augment the threat analysis using pattern recognition and statistical analyses of data for threat training to address mutating and evolving cyber threats. The implementation of regression, classification, clustering, rule learning, and model generation are ways that the known threat characteristics are expanded.

Figure 9:
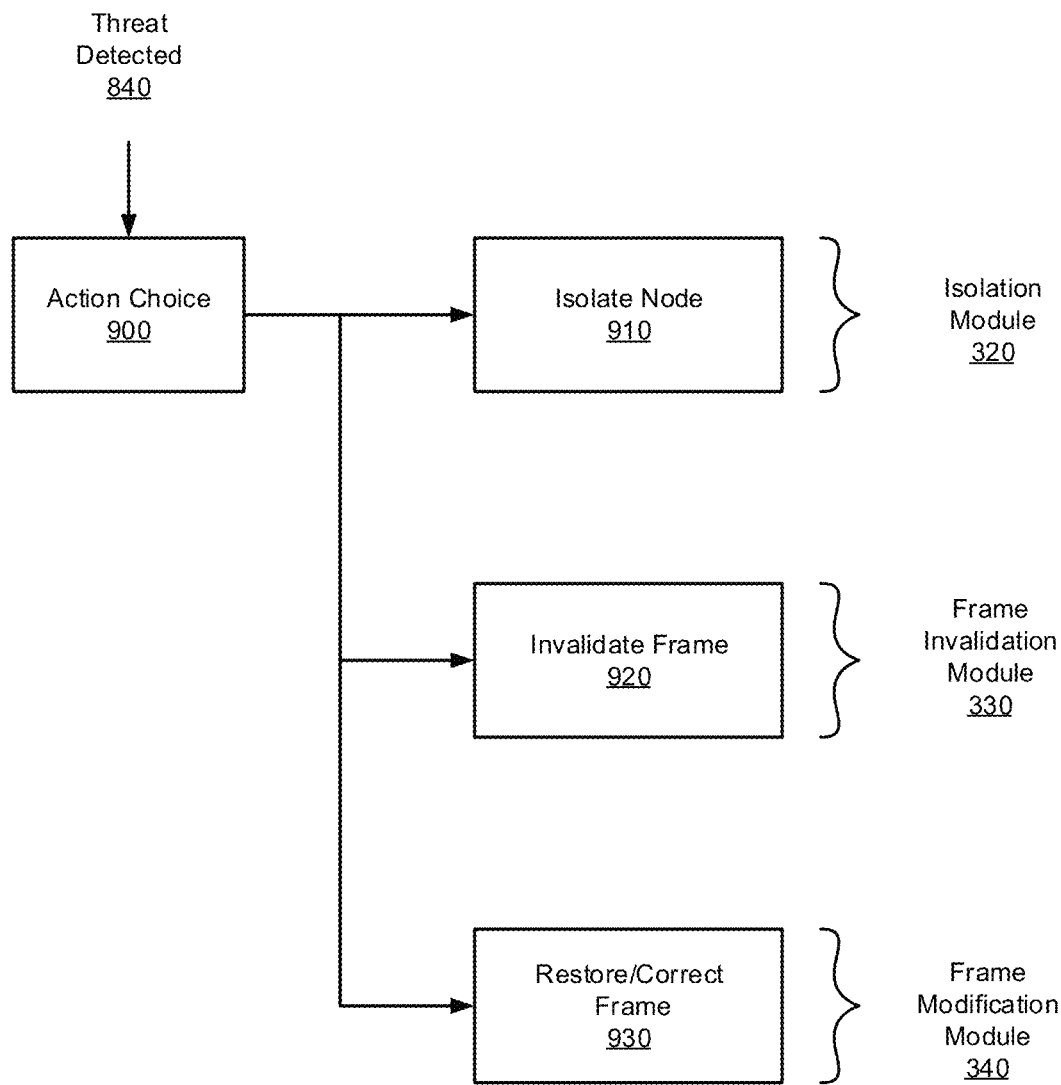
FIG. 9 is a flowchart illustrating a methodology for bus control to prevent threat delivery, in accordance with an embodiment of the present disclosure.

As illustrated in FIG. 9, in one embodiment method 630 for prevention of threat delivery, commences, at operation 900, by choosing one or more of several possible actions, in response to the detected threat 840. In some embodiments, one action choice is to isolate the node, as performed at operation 910. The node may be isolated from the communications bus by sending a control signal to the switch matrix 230 to cause the switch matrix to disconnect the bus transceiver 200 from the bus 170.

In some embodiments, another action choice is to invalidate the frame, as performed at operation 920. The message frame is invalidated by sending a control signal and data to the override bus transceiver/amplifier 240 causing the data to be overwritten onto the bus. The overwrite data can contain an invalid message and/or invalid CRC/parity information configured to cause all other receiving nodes to reject the frame.

In some embodiments, another action choice is to restore or correct the frame, as performed at operation 930. The message frame is modified by sending a control signal and data to the override bus transceiver/amplifier 240. The overwrite data can contain a valid message and a new correct CRC/parity associated with the modified message. The new valid message, or portion thereof, may be designed to implement code that is harmless in effect, or designed to serve some other purpose, in place of the pre-existing cyber-attack code. In some embodiments, the modification serves to correct/restore the threat corrupted message as previously described.

Of course, in some embodiments, additional operations may be performed, as previously described in connection with the system. These additional operations may include, for example, transmitting an acknowledgement signal on the communications bus so that the originator of the message believes that the message was received and does not attempt to re-transmit. In some embodiments, active control of the communications bus is achieved by applying voltages and/or loads to the signal lines of the bus to change bits from ones to zeros and vice versa.

Example Systems

Figure 10:
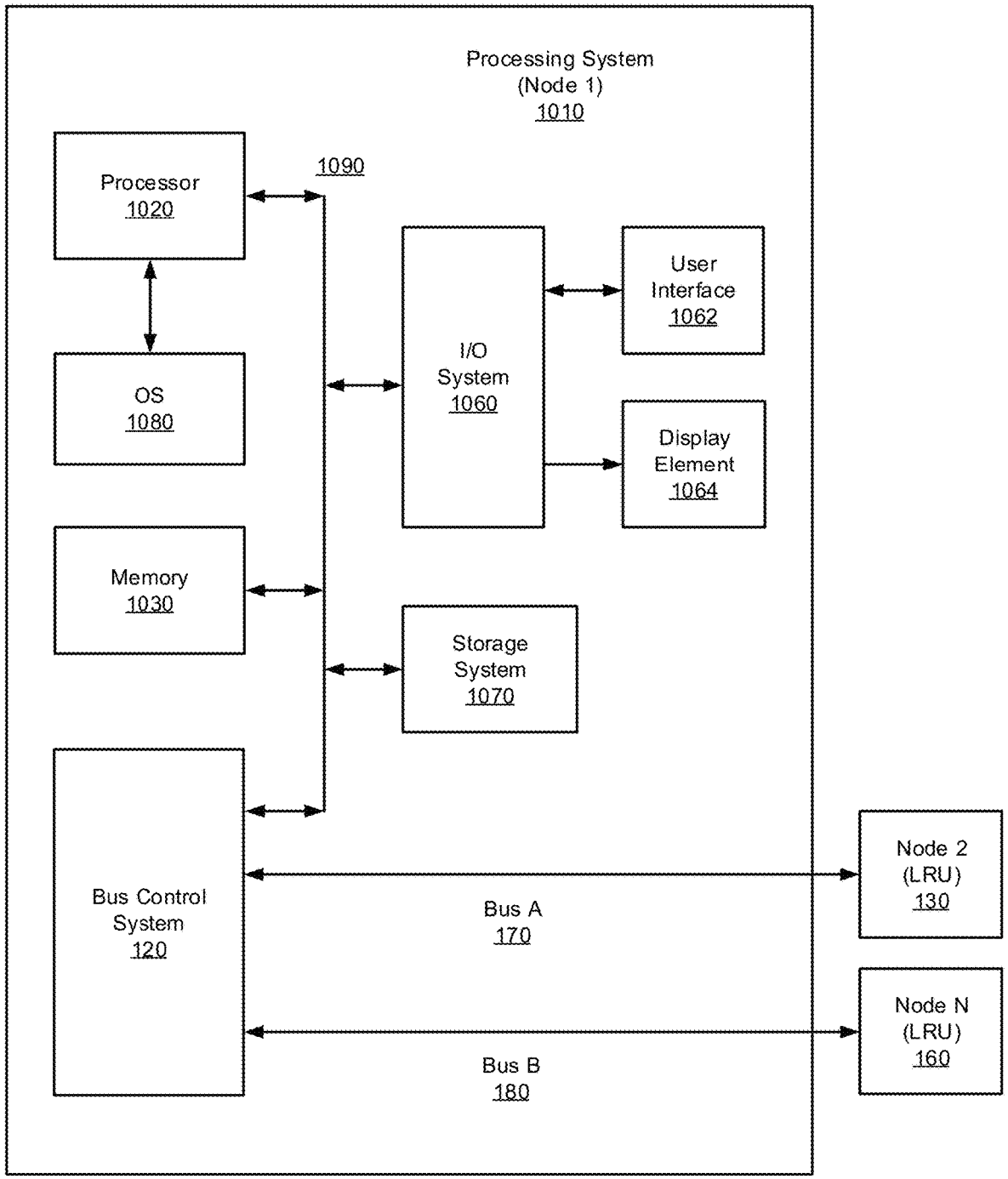
FIG. 10 is a block diagram schematically illustrating a processing system employing the active bus control system, in accordance with certain embodiments of the present disclosure.

FIG. 10 is a block diagram schematically illustrating a processing system 1010 (e.g., for node 1 on the communications bus) employing the disclosed active bus control system 120, in accordance with certain embodiments of the present disclosure. In some embodiments, processing system 1010, or portions thereof, may be hosted on, or otherwise be incorporated into a projectile or missile, the electronic systems of the projectile (whether those electronic systems are on-board the projectile, or ground-based, or mobile-platform-based), or any other mobile or fixed platform, including industrial plant, office building, and home environments, to name just a few.

In some embodiments, processing system 1010 may comprise any combination of a processor 1020, a memory 1030, an input/output (I/O) system 1060, a user interface 1062, a display element 1064, a storage system 1070, and bus control system 120 configured to control communications busses (e.g., bus A 170, bus B, 180, etc.). As can be further seen, a local bus 1090 (e.g., internal to the node) is also provided to allow for communication between the various components listed above and/or other components not shown. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or hardware accelerator, to assist in control and processing operations associated with system 1010. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1020 may be configured to execute an Operating System (OS) 1080 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with system 1010, and therefore may also be implemented using any suitable existing or subsequently-developed systems or platforms.

I/O system 1060 may be configured to interface between various I/O devices and other components of system 1010. I/O devices may include, but not be limited to, user interface 1062 and display element 1064, which may be utilized for configuration and testing of the system, for example. User interface 1062 may include other devices (not shown) such as a touchpad, keyboard, mouse, microphone and speaker, trackball or scratch pad, and camera. I/O system 1060 may include a graphics subsystem configured to perform processing of images for rendering on the display element 1064. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of system 1010.

It will be appreciated that in some embodiments, some of the various components of system 1010 may be combined or integrated in a system-on-a-chip (SoC) architecture. In some embodiments, the components may be hardware components, firmware components, software components or any suitable combination of hardware, firmware or software.

Bus control system 120 is configured to actively control the communications busses 170, 180, to mitigate cyberattacks and other such threats, as described previously. Bus control system 120 may include any or all of the circuits/components illustrated in FIGS. 1-5, as described above. These components can be implemented or otherwise used in conjunction with a variety of suitable software and/or hardware that is coupled to or that otherwise forms a part of system 1010. These components can additionally or alternatively be implemented or otherwise used in conjunction with user I/O devices that are capable of providing information to, and receiving information and commands from, a user.

Various embodiments of system 1010 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductors), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments system 1010 may comprise additional, fewer, or alternative subcomponents as compared to those included in the example embodiment of FIG. 10.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a bus control system for threat mitigation, the system comprising: a threat management circuit configured to detect a threat based on analysis of an initial portion of a message frame, the message frame transmitted between nodes on the bus, the analysis including a comparison of the initial portion of the message frame to known threat characteristics; and a bus management circuit configured to control the bus, based on the threat detection, to prevent a remaining portion of the message frame from delivering the threat to one or more of the nodes, by using a switch matrix to isolate one or more of the nodes from the bus or by using an override transceiver to modify the message frame.

In some cases, the override transceiver circuit is configured to control the bus by overwriting data on the remaining portion of the message frame to invalidate the message frame and/or overwriting an error code on the message frame to invalidate the message frame. In some cases, the override transceiver circuit is configured to control the bus by overwriting data on the remaining portion of the message frame to remove the threat from the message frame. In some cases, the override transceiver circuit is configured to control the bus by overwriting data on the remaining portion of the message frame to correct the message frame. In some cases, the override transceiver circuit is configured to control the bus by applying voltages and/or loads to signal lines of the bus. In some cases, the bus management circuit is configured to generate an acknowledgement signal for the message frame. In some cases, the system further comprises: an analog to digital converter configured to digitize analog signals on signal lines of the bus; a feature extraction circuit configured to analyze waveform shapes of the digitized analog signals to extract features; and the threat management circuit is configured to compare the extracted features to threat characteristics obtained from a threat database.

Another example embodiment of the present disclosure provides a computer program product including one or more machine-readable mediums encoded with instructions that when executed by one or more processors cause a process to be carried out for control of a bus for threat mitigation, the process comprising: detecting a threat based on analysis of an initial portion of a message frame, the message frame transmitted between nodes on the bus, the analysis including a comparison of the initial portion of the message frame to known threat characteristics; and controlling the bus, based on the threat detection, to prevent a remaining portion of the message frame from delivering the threat to one or more of the nodes, by controlling a switch matrix to isolate one or more of the nodes from the bus or by controlling an override transceiver to modify the message frame.

In some cases, controlling the bus comprises overwriting data on the remaining portion of the message frame to invalidate the message frame and/or overwriting an error code on the message frame to invalidate the message frame. In some cases, controlling the bus comprises overwriting data on the remaining portion of the message frame to remove the threat from the message frame. In some cases, controlling the bus comprises overwriting data on the remaining portion of the message frame to correct the message frame. In some cases, controlling the bus comprises controlling an override transceiver circuit is apply voltages and/or loads to signal lines of the bus. In some cases, controlling the bus comprises generating an acknowledgement signal for the message frame.

Another example embodiment of the present disclosure provides a method for controlling a bus to mitigate threats, the method comprising: detecting, by a processor-based system, a threat based on analysis of an initial portion of a message frame, the message frame transmitted between nodes on the bus, the analysis including a comparison of the initial portion of the message frame to known threat characteristics; and controlling, by the processor-based system, the bus, based on the threat detection, to prevent a remaining portion of the message frame from delivering the threat to one or more of the nodes, by controlling a switch matrix to isolate one or more of the nodes from the bus or by controlling an override transceiver to modify the message frame.

In some cases, controlling the bus comprises overwriting data on the remaining portion of the message frame to invalidate the message frame and/or overwriting an error code on the message frame to invalidate the message frame. In some cases, controlling the bus comprises overwriting data on the remaining portion of the message frame to remove the threat from the message frame. In some cases, controlling the bus comprises overwriting data on the remaining portion of the message frame to correct the message frame. In some cases, controlling the bus comprises controlling an override transceiver circuit is apply voltages and/or loads to signal lines of the bus. In some cases, controlling the bus comprises generating an acknowledgement signal for the message frame. In some cases, the method further comprises digitizing analog signals on signal lines of the bus; analyzing waveform shapes of the digitized analog signals to extract features; and comparing the extracted features to threat characteristics obtained from a threat database.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A bus control system for threat mitigation, the system comprising:
   a threat management circuit configured to detect a threat based on analysis of an initial portion of a message frame, the message frame transmitted between nodes on the bus, the analysis including a comparison of the initial portion of the message frame to known threat characteristics, wherein the length of the initial portion of the message frame is determined based on a real-time aggregation of units of data such that the initial portion of the message extends from the beginning of the message frame until the point where enough data is available to make a threat determination; and
   a bus management circuit configured to control the bus, based on the threat detection, to prevent a remaining portion of the message frame from delivering the threat to one or more of the nodes, by using a switch matrix to isolate one or more of the nodes from the bus or by using an override transceiver to modify the message frame.

2. The system of claim 1, wherein the override transceiver circuit is configured to control the bus by overwriting data on the remaining portion of the message frame to invalidate the message frame and/or overwriting an error code on the message frame to invalidate the message frame.

3. The system of claim 1, wherein the override transceiver circuit is configured to control the bus by overwriting data on the remaining portion of the message frame to remove the threat from the message frame.

4. The system of claim 1, wherein the override transceiver circuit is configured to control the bus by overwriting data on the remaining portion of the message frame to correct the message frame.

5. The system of claim 1, wherein the override transceiver circuit is configured to control the bus by applying voltages and/or loads to signal lines of the bus.

6. The system of claim 1, wherein the bus management circuit is configured to generate an acknowledgement signal for the message frame.

7. The system of claim 1, further comprising:
   an analog to digital converter configured to digitize analog signals on signal lines of the bus;
   a feature extraction circuit configured to analyze waveform shapes of the digitized analog signals to extract features; and
   the threat management circuit is configured to compare the extracted features to threat characteristics obtained from a threat database.

8. A computer program product including one or more non-transitory machine-readable mediums encoded with instructions that when executed by one or more processors cause a process to be carried out for control of a bus for threat mitigation, the process comprising:
   detecting a threat based on analysis of an initial portion of a message frame, wherein the length of the initial portion of the message frame is determined based on a real-time aggregation of units of data such that the initial portion of the message extends from the beginning of the message frame until the point where enough data is available to make a threat determination, the message frame transmitted between nodes on the bus, the analysis including a comparison of the initial portion of the message frame to known threat characteristics; and
   controlling the bus, based on the threat detection, to prevent a remaining portion of the message frame from delivering the threat to one or more of the nodes, by controlling a switch matrix to isolate one or more of the nodes from the bus or by controlling an override transceiver to modify the message frame.

9. The computer program product of claim 8, wherein controlling the bus comprises overwriting data on the remaining portion of the message frame to invalidate the message frame and/or overwriting an error code on the message frame to invalidate the message frame.

10. The computer program product of claim 8, wherein controlling the bus comprises overwriting data on the remaining portion of the message frame to remove the threat from the message frame.

11. The computer program product of claim 8, wherein controlling the bus comprises overwriting data on the remaining portion of the message frame to correct the message frame.

12. The computer program product of claim 8, wherein controlling the bus comprises controlling an override transceiver circuit is apply voltages and/or loads to signal lines of the bus.

13. The computer program product of claim 8, wherein controlling the bus comprises generating an acknowledgement signal for the message frame.

14. A method for controlling a bus to mitigate threats, the method comprising:
- detecting, by a processor-based system, a threat based on analysis of an initial portion of a message frame, wherein the length of the initial portion of the message frame is determined based on a real-time aggregation of units of data such that the initial portion of the message extends from the beginning of the message frame until the point where enough data is available to make a threat determination, the message frame transmitted between nodes on the bus, the analysis including a comparison of the initial portion of the message frame to known threat characteristics; and
- controlling, by the processor-based system, the bus, based on the threat detection, to prevent a remaining portion of the message frame from delivering the threat to one or more of the nodes, by controlling a switch matrix to isolate one or more of the nodes from the bus or by controlling an override transceiver to modify the message frame.

15. The method of claim 14, wherein controlling the bus comprises overwriting data on the remaining portion of the message frame to invalidate the message frame and/or overwriting an error code on the message frame to invalidate the message frame.

16. The method of claim 14, wherein controlling the bus comprises overwriting data on the remaining portion of the message frame to remove the threat from the message frame.

17. The method of claim 14, wherein controlling the bus comprises overwriting data on the remaining portion of the message frame to correct the message frame.

18. The method of claim 14, wherein controlling the bus comprises controlling an override transceiver circuit is apply voltages and/or loads to signal lines of the bus.

19. The method of claim 14, wherein controlling the bus comprises generating an acknowledgement signal for the message frame.

20. The method of claim 14, further comprising:
- digitizing analog signals on signal lines of the bus;
- analyzing waveform shapes of the digitized analog signals to extract features; and
- comparing the extracted features to threat characteristics obtained from a threat database.

* * * * *